United States Patent
Obenaus

(10) Patent No.: US 9,410,461 B2
(45) Date of Patent: Aug. 9, 2016

(54) INTERNAL COMBUSTION ENGINE

(71) Applicant: AVL LIST GMBH, Graz (AT)

(72) Inventor: Thomas Obenaus, Fernitz (AT)

(73) Assignee: AVL LIST GMBH, Graz (AT)

(*) Notice: Subject to any disclaimer, the term of this patent is extended or adjusted under 35 U.S.C. 154(b) by 0 days.

(21) Appl. No.: 14/365,681

(22) PCT Filed: Dec. 13, 2012

(86) PCT No.: PCT/EP2012/075416
§ 371 (c)(1),
(2) Date: Jun. 16, 2014

(87) PCT Pub. No.: WO2013/087784
PCT Pub. Date: Jun. 20, 2013

(65) Prior Publication Data
US 2014/0352285 A1    Dec. 4, 2014

(30) Foreign Application Priority Data

Dec. 14, 2011    (AT) .............................. A 50007/2011

(51) Int. Cl.
*F01N 13/08*    (2010.01)
*F01N 3/20*    (2006.01)
*F01N 13/14*    (2010.01)
(Continued)

(52) U.S. Cl.
CPC .............. *F01N 3/208* (2013.01); *F01N 3/2053* (2013.01); *F01N 3/2066* (2013.01); *F01N 3/2892* (2013.01); *F01N 13/145* (2013.01); *F01N 13/1816* (2013.01); *F01N 3/2875* (2013.01); *F01N 2240/20* (2013.01); *F01N 2240/36* (2013.01); *F01N 2410/00* (2013.01); *F01N 2470/08* (2013.01); *F01N 2470/16* (2013.01); *F01N 2470/24* (2013.01); *F01N 2590/08* (2013.01); *F01N 2590/10* (2013.01); *F01N 2610/02* (2013.01); *Y02T 10/24* (2013.01)

(58) Field of Classification Search
CPC ... F01N 3/2053; F01N 3/2066; F01N 3/2875; F01N 3/2892; F01N 13/1816; F01N 2240/20; F01N 2240/36; F01N 2410/00; F01N 2470/08; F01N 2470/16; F01N 2470/24; F01N 2610/02; F01N 2610/1453
USPC ........... 60/286, 288, 295, 300, 301, 320, 322, 60/324
See application file for complete search history.

(56) References Cited

U.S. PATENT DOCUMENTS 5,967,193 A * 10/1999 Nagai et al. ................... 138/110
6,312,650 B1 * 11/2001 Frederiksen et al. ......... 422/180
(Continued)

FOREIGN PATENT DOCUMENTS

DE    10 2008 036046 A1    2/2010
DE    10 2010 025611 A1    1/2011
(Continued)

*Primary Examiner* — Jorge Leon, Jr.
(74) *Attorney, Agent, or Firm* — Todd A. Vaughn; Jordan IP Law, LLC

(57) ABSTRACT

An internal combustion engine, in particular a large multi-fuel diesel internal combustion engine, and includes an SCR catalytic converter that can be bypassed, and at least one control element for switching the flow in an exhaust gas line between a first position where the SCR catalytic converter is active and a second position where the SCR catalytic converter is bypassed, and at least one flow path bypassing the SCR catalytic converter.

17 Claims, 3 Drawing Sheets

(51) Int. Cl.
*F01N 13/18* (2010.01)
*F01N 3/28* (2006.01)

(56) References Cited

U.S. PATENT DOCUMENTS

| | | | |
|---|---|---|---|
| 6,315,332 B1 * | 11/2001 | Aschoff et al. | 285/227 |
| 6,884,398 B1 * | 4/2005 | Biel et al. | 422/179 |
| 2002/0171240 A1 * | 11/2002 | Cwik | 285/301 |
| 2004/0100096 A1 * | 5/2004 | Atansoski et al. | 285/299 |
| 2005/0166576 A1 * | 8/2005 | Funabashi | 60/278 |
| 2005/0242577 A1 * | 11/2005 | Baumann et al. | 285/226 |
| 2006/0081302 A1 * | 4/2006 | Taira et al. | 138/118 |
| 2008/0066451 A1 * | 3/2008 | Warner et al. | 60/286 |

FOREIGN PATENT DOCUMENTS

| | | |
|---|---|---|
| EP | 1 559 879 A1 | 8/2005 |
| WO | 2006/121993 A2 | 11/2006 |

* cited by examiner

INTERNAL COMBUSTION ENGINE

CROSS-REFERENCE TO RELATED APPLICATIONS

The present application is a National Stage Application of PCT International Application No. PCT/EP2012/075416 (filed on Dec. 13, 2012), under 35 U.S.C. §371, which claims priority to Austrian Patent Application No. A 50007/2011 (filed on Dec. 14, 2011), which are each hereby incorporated by reference in their respective entireties.

TECHNICAL FIELD

The invention relates to an internal combustion engine, in particular a large multi-fuel diesel internal combustion engine, comprising an SCR catalytic converter that can be bypassed, and at least one control element for switching the flow in an exhaust gas line between a first position where the SCR catalytic converter is active and a second position where the SCR catalytic converter is bypassed, and at least one flow path bypassing the SCR catalytic converter.

BACKGROUND

From German Patent Publication No. DE 10 2005 015479 A1 it is known to bypass an SCR catalytic converter (SCR=selective catalytic reduction) by means of a bypass line in order to keep the temperature of the exhaust gases flowing through the catalytic converter within a certain range.

French Patent Publication No. FR 2 914 947 A1 discloses an internal combustion engine with an exhaust gas line containing an SCR catalytic converter where a bypass line controlled by a control element is provided for bypassing the SCR catalytic converter.

German Patent Publication No. DE 44 21 257 A1 discloses an internal combustion engine with two groups of cylinders, which can be switched off individually, each group having its own exhaust gas catalytic converter. In order to avoid cooling of the catalytic converter below its operating temperature when the corresponding cylinder is switched off, the entire exhaust gas line is designed in such a way that the gases expelled from the switched-off cylinder group are heated by the exhaust gases of the active cylinder group. No bypass line is provided for bypassing the catalytic converters.

Furthermore there is known from European Patent Publication No. EP 0 580 931 A1 an internal combustion engine with a bypassable start-up catalytic converter, wherein for reliable and fast switching between a cold-operation state in which the start-up catalytic converter is activated and a hot-operation state in which the start-up catalytic converter is bypassed, the control element is configured as a slideable annular exhaust gas sleeve, which can slide along and is coaxial with the exhaust gas line.

Especially in the case of large multi-fuel marine engines the quality of the exhaust gas is strongly dependent on the fuel used. In order to comply with severe exhaust gas regulations in coastal waters, among other measures SCR catalytic converters are used in marine engines for the reduction of nitrous gases. To avoid contamination and destruction of the SCR catalytic converter when the engine is running on heavy fuel oil the SCR converter can be bypassed by means of a bypass line. External bypass lines, however, have the disadvantage of substantially increasing the space required for the engine. As a further drawback the deactivated SCR converter will cool to below minimum operating temperature.

SUMMARY

It is the object of the present invention to avoid these disadvantages and to prevent by simple, space-saving measures any inacceptable contamination or destruction of the SCR catalytic converter under difficult operating conditions.

According to the invention this object is achieved by providing that the flow path bypassing the SCR catalytic converter be configured as an annular space between two concentric pipes that are preferably coaxial, the SCR catalytic converter being placed in the inner pipe, and a first inlet pipe leading to the inner pipe and a second inlet pipe leading to the bypass flow path.

The concentrical configuration of the bypass flow path relative to the inner pipe containing the SCR catalytic converter will permit a very compact design. By means of a first control element in the first inlet pipe the flow path to the SCR catalytic converter may be opened or closed. Upstream of the first control element an additive metering device is located in the first inlet pipe for an aqueous urea solution. In the second inlet pipe a second control element may be disposed which opens or closes the bypass flow path. During gas operation or low-emission operation the SCR catalytic converter is activated, during heavy-oil operation it is deactivated. Since the bypass flow path envelopes the SCR catalytic converter, the converter is heated by the envelope of exhaust gases even in its deactivated state. Thus the SCR catalytic converter is fully operational within a very short time.

In order to attenuate vibrations and to compensate thermal variations in length it may be provided in a further variant of the invention that at least one compensating element be disposed between at least two axially spaced sections of the inner and/or outer pipe, or between the inner pipe or the outer pipe and the first or second inlet pipe. By integrating the compensating element(s) in the housing of the SCR catalytic converter further space will be saved and vibration and length compensation may be effected within the housing of the SCR converter. In a variant that is particularly compact and easy to manufacture it is provided that the first compensating element and the second compensating element are configured as a joint dual compensator unit, the first and second compensator elements preferably being connected by radial webs.

DRAWINGS

The invention will now be explained in greater detail with reference to the enclosed drawings.

DESCRIPTION

Figure 1:
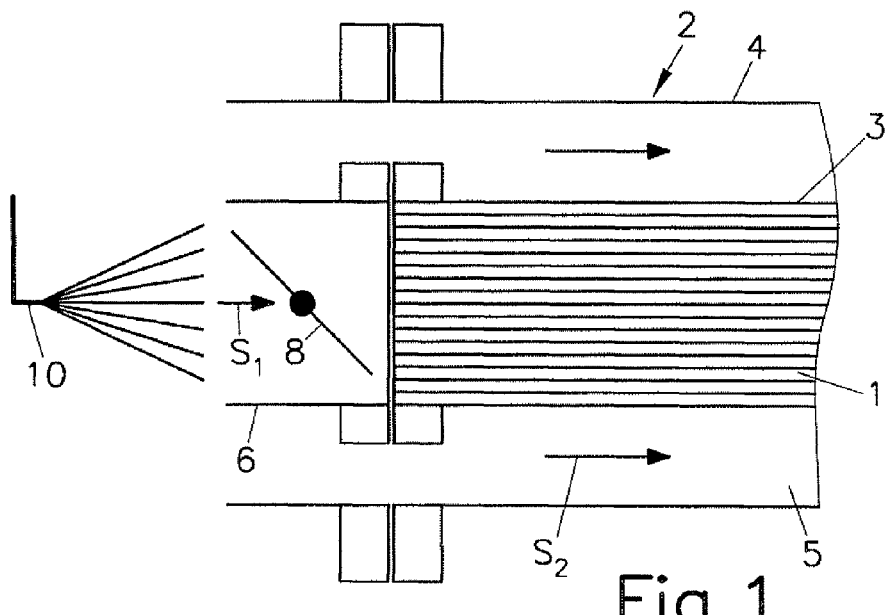
FIG. 1 illustrates a sectional view of a SCR catalytic converter of an internal combustion engine, in accordance with embodiments.

The drawings schematically show longitudinal sections of diverse variants of SCR catalytic converters of internal combustion engines according to the invention.

In all variants, the SCR catalytic converter 1 is disposed in a housing 2 which includes two concentric, radially spaced pipes 3, 4 enclosing an annular space 5. The SCR catalytic converter is placed in the inner pipe 3. The annular space 5 forms a flow path $S_2$ for bypassing the SCR converter.

Figure 2:
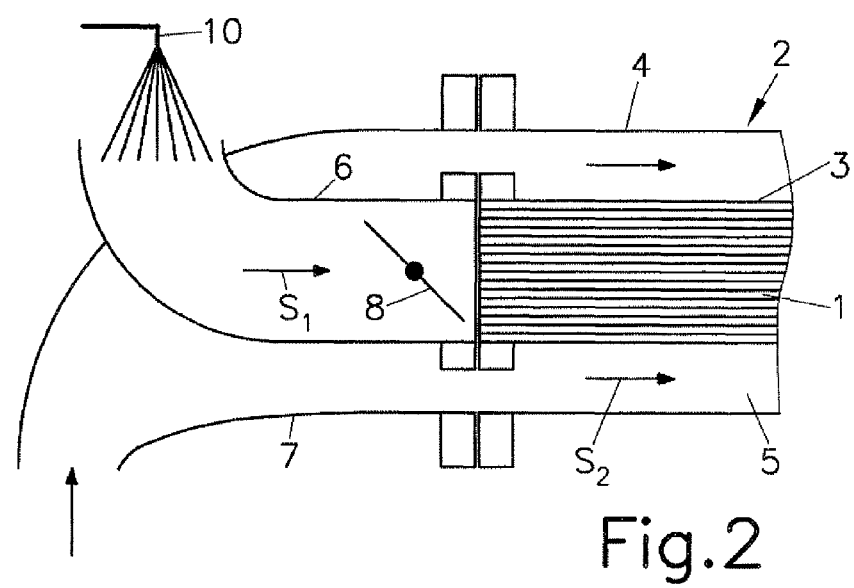
FIG. 2 illustrates a sectional view of a SCR catalytic converter of an internal combustion engine, in accordance with embodiments.
Figure 3:
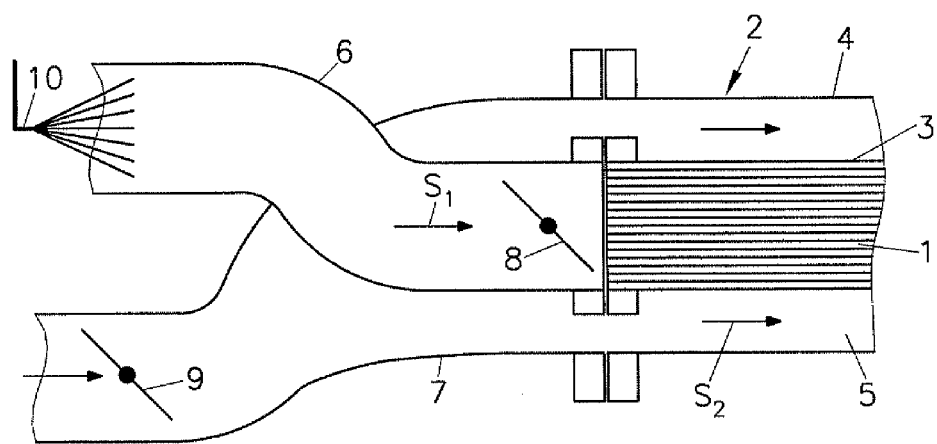
FIG. 3 illustrates a sectional view of a SCR catalytic converter of an internal combustion engine, in accordance with embodiments.
Figure 4:
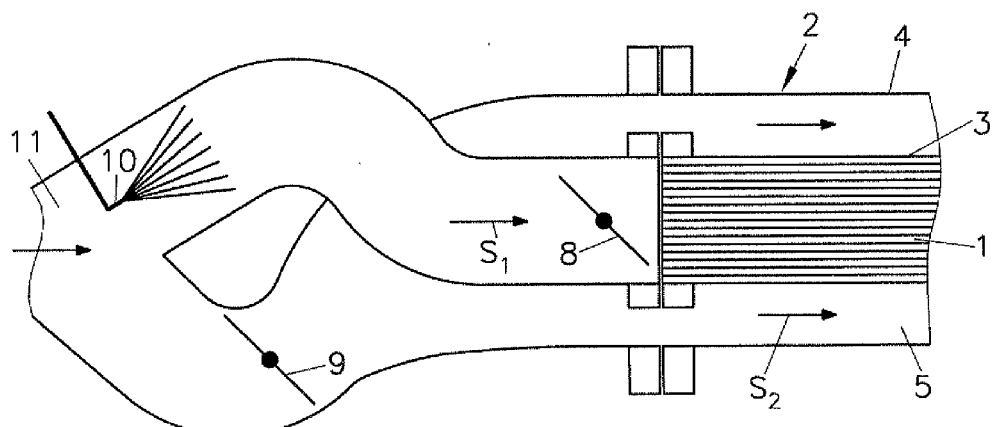
FIG. 4 illustrates a sectional view of a SCR catalytic converter of an internal combustion engine, in accordance with embodiments.

The inner pipe 3 connects to a first inlet pipe 6, while the outer pipe 4 connects to a second inlet pipe 7. In the first inlet pipe 6 there is disposed a first control element 8, for instance a switching flap, which permits the exhaust gas flow $S_1$ to reach the SCR catalytic converter 1 or prevents it therefrom. A further control element 9 may be located in the second inlet pipe 7, which also may be configured as a simple switching flap (See, FIGS. 3 and 4). The inlet pipes 6, 7 may be configured as curved or S-shaped pipes, with the first inlet pipe 6 partly running inside the second inlet pipe 7 (See, FIGS. 2 to 4). As shown in FIG. 4, the two inlet pipes 6, 7 may depart from a common exhaust gas line 11.

Upstream of the first control element 8 there is provided an additive metering device 10 for feeding an aqueous urea solution as a reaction agent into the SCR catalytic converter.

Besides the advantages already mentioned, i.e., compact design and protection of the converter from contamination, this variant also provides an at least partly heated mixing path between the additive metering device 10 and the SCR catalytic converter 1, since the inner pipe 3 is surrounded and thus heated by hot exhaust gases. This will ensure good evaporation and mixing of the reducing agent and will inhibit deposition of the reducing agent on the inner surface of the inner pipe.

Figure 5:
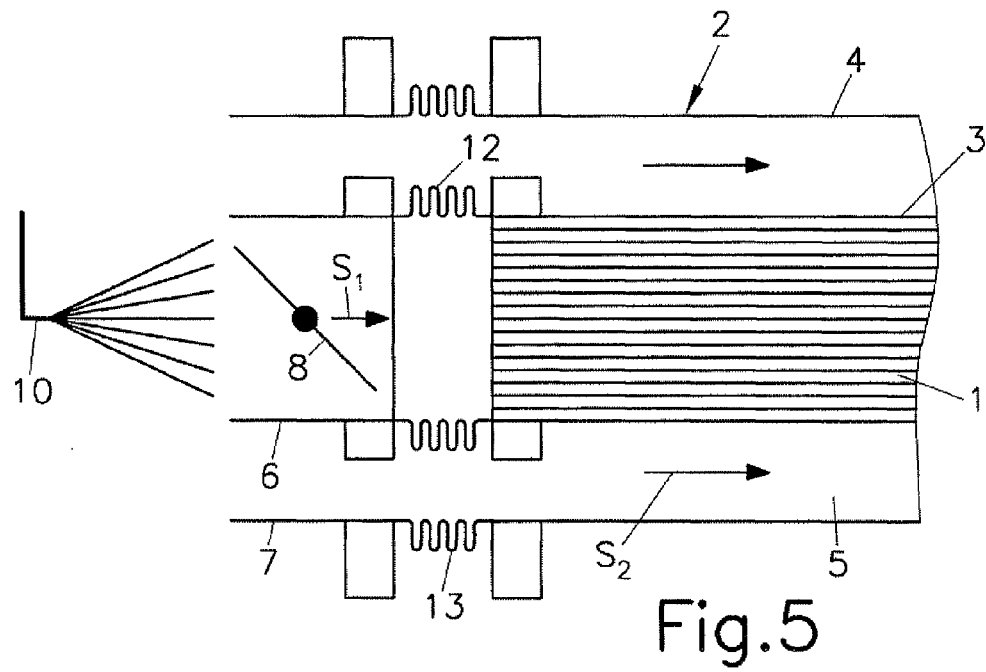
FIG. 5 illustrates a sectional view of a SCR catalytic converter of an internal combustion engine, in accordance with embodiments.
Figure 6:
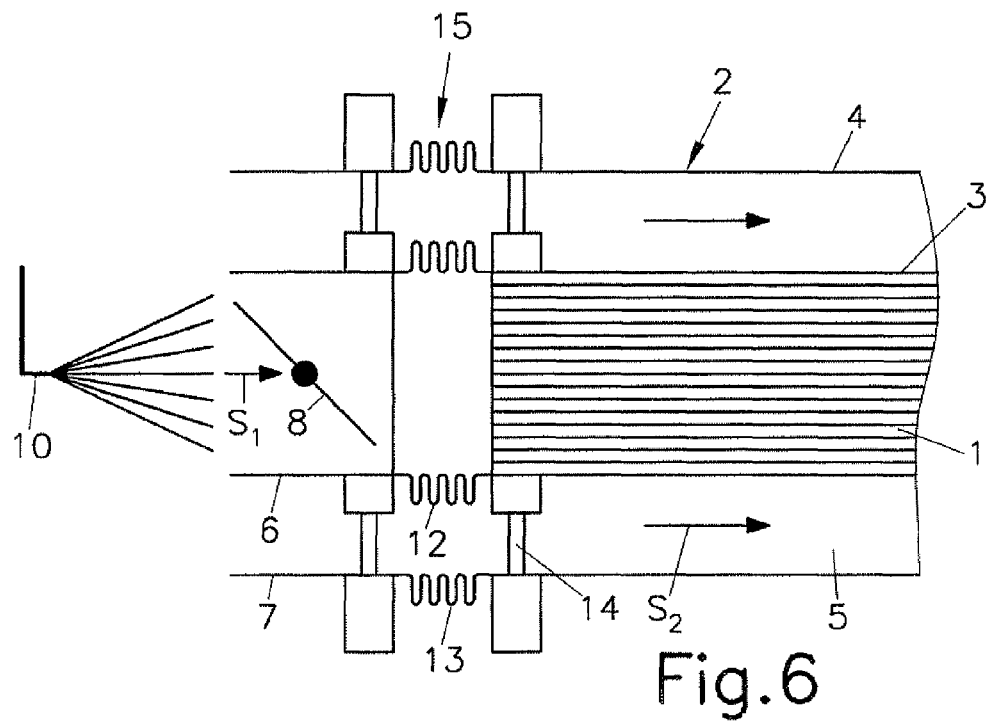
FIG. 6 illustrates a sectional view of a SCR catalytic converter of an internal combustion engine, in accordance with embodiments.

FIGS. 5 and 6 show variants in which at least one first or second compensating element 12, 13 is disposed between axially distanced sections of the inner pipe 3 or the outer pipe 4 and/or between the inner pipe 3 and the first inlet pipe 6 or between the outer pipe 4 and the second inlet pipe 7, in order to compensate vibrations and/or heat induced changes in length. FIG. 5 shows a variant having separate compensating elements 12, 13 for the inner pipe 3 and the outer pipe 4. In FIG. 6 the compensating elements 12, 13 are connected by means of radial webs 14, forming a dual compensator unit 15. The dual compensator unit 15 may be mounted as one piece.

What is claimed is:
1. An internal combustion engine, comprising:
   a bypassable SCR catalytic converter; and
   at least one control element to switch a flow of an exhaust gas line between a first position where the SCR catalytic converter is active and a second position where the SCR catalytic converter is bypassed;
   at least one bypass flow path which bypasses the SCR catalytic converter, said flow path bypassing the SCR catalytic converter and configured as an annular space between concentric pipes including an inner pipe and an outer pipe, in which the SCR catalytic converter is located in the inner pipe, wherein a first inlet pipe connects to the inner pipe, and a second inlet pipe connects to the at least one bypass flow path, with the first inlet pipe partly running inside the second inlet pipe;
   a first control element provided in the first inlet pipe; and
   an additive metering device located in the first inlet pipe, wherein the additive metering device is located upstream of the first control element.

2. The internal combustion engine of claim 1, further comprising a second control element disposed in the second inlet pipe.

3. The internal combustion engine of claim 1, wherein the additive metering device is positioned upstream of a bend of the first inlet pipe.

4. The internal combustion engine of claim 1, wherein the first inlet pipe and the second inlet pipe depart from a common exhaust gas line.

5. The internal combustion engine of claim 1, further comprising at least one first compensating element provided between at least two axially distanced sections of the inner pipe, or between the inner pipe and the first inlet pipe.

6. The internal combustion engine of claim 5, further comprising at least one second compensating element provided between at least two axially distanced sections of the outer pipe, or between the outer pipe and the second inlet pipe.

7. The internal combustion engine of claim 6, wherein the first compensating element and the second compensating element are configured as a joint dual compensator unit.

8. The internal combustion engine of claim 7, wherein the first compensating element and the second compensating element are connected by way of radial webs.

9. A multi-fuel diesel internal combustion engine, comprising:
   a bypassable SCR catalytic converter; and
   at least one control element to switch a flow of an exhaust gas line between a first position where the SCR catalytic converter is active and a second position where the SCR catalytic converter is bypassed;
   at least one bypass flow path which bypasses the SCR catalytic converter, said flow path bypassing the SCR catalytic converter and configured as an annular space between concentric pipes including an inner pipe and an outer pipe, in which the SCR catalytic converter is located in the inner pipe, wherein a first inlet pipe connects to the inner pipe and a second inlet pipe connects to the at least one bypass flow path, with the first inlet pipe partly running inside the second inlet pipe;
   a first control element provided in the first inlet pipe; and
   an additive metering device located in the first inlet pipe, wherein the additive metering device is located upstream of the first control element.

10. An internal combustion engine, comprising:
    a bypassable SCR catalytic converter; and
    at least one control element to switch a flow of an exhaust gas line between a first position where the SCR catalytic converter is active and a second position where the SCR catalytic converter is bypassed;
    at least one bypass flow path which bypasses the SCR catalytic converter, said flow path bypassing the SCR catalytic converter and configured as an annular space between an outer pipe and a concentrically arranged inner pipe in which the SCR catalytic converter is located;
    a first inlet pipe connected to the inner pipe;
    a second inlet pipe connected to the at least one bypass flow path, wherein the first inlet pipe partly runs inside the second inlet pipe; and
    a first control element provided in the first inlet pipe.

11. The internal combustion engine of claim 10, further comprising a second control element disposed in the second inlet pipe.

12. The internal combustion engine of claim 10, further comprising an additive metering device located in the first inlet pipe.

13. The internal combustion engine of claim 12, wherein the additive metering device is located upstream of the first control element.

14. The internal combustion engine of claim 12, wherein the additive metering device is positioned upstream of a bend of the first inlet pipe.

15. The internal combustion engine of claim 10, wherein the first inlet pipe and the second inlet pipe depart from a common exhaust gas line.

16. The internal combustion engine of claim 10, further comprising:
   at least one first compensating element provided between at least two axially distanced sections of the inner pipe; and
   at least one second compensating element provided between at least two axially distanced sections of the outer pipe.

17. The internal combustion engine of claim 10, further comprising:
   at least one first compensating element provided between the inner pipe and the first inlet pipe; and
   at least one second compensating element provided between the outer pipe and the second inlet pipe.

\* \* \* \* \*